(12) United States Patent
Lynch et al.

(10) Patent No.: US 8,153,707 B2
(45) Date of Patent: Apr. 10, 2012

(54) VOC-FREE COALESCING AGENT

(75) Inventors: Thomas Lynch, Chesterfield, NJ (US); Wilbur Mardis, Holland, PA (US)

(73) Assignee: Elementis Specialties, Inc., Hightstown, NJ (US)

( * ) Notice: Subject to any disclaimer, the term of this patent is extended or adjusted under 35 U.S.C. 154(b) by 114 days.

(21) Appl. No.: 12/623,524

(22) Filed: Nov. 23, 2009

(65) Prior Publication Data

US 2010/0130645 A1    May 27, 2010

Related U.S. Application Data

(60) Provisional application No. 61/116,735, filed on Nov. 21, 2008.

(51) Int. Cl.
*C08C 1/08* (2006.01)

(52) U.S. Cl. ......... 523/335; 524/300; 524/306; 524/308

(58) Field of Classification Search .................. 523/335; 524/300, 306, 308
See application file for complete search history.

(56) References Cited

U.S. PATENT DOCUMENTS

| | | |
|---|---|---|
| 4,131,580 A | 12/1978 | Emmons |
| 4,141,868 A | 2/1979 | Emmons |
| 4,229,362 A | 10/1980 | Norman |
| 4,341,656 A | 7/1982 | Abel |
| 4,551,491 A | 11/1985 | Panush |
| 4,629,753 A * | 12/1986 | Quinn ........................ 524/394 |
| 4,781,948 A | 11/1988 | Caldwell |
| 6,300,508 B1 | 10/2001 | Raths |

OTHER PUBLICATIONS

Shaw et al., "Optimized Enzymatic Synthesis of Propylene Glycol Monolaurate by Direct Esterification", Food Chemistry vol. 81, Issue 1, May 2003, abstract.
Written Opinion and International Search Report for International Application No. PCT/US 09/65453 completed on Jan. 10, 2010.
Publication of PCT/US2010/058922 dated May 27, 2010, 42 pages.
International Preliminary Report on Patentability of PCT/US2010/058922 dated Jun. 3, 2011, 6 pages.

* cited by examiner

*Primary Examiner* — Edward Cain
(74) *Attorney, Agent, or Firm* — Morgan, Lewis & Bockius LLP

(57) ABSTRACT

A film-forming composition including a coalescent aid comprising fatty acid esters of ethylene glycol and/or propylene glycol having the formula $R^1COO[(EO)_x(PO)_y]_zH$ wherein $R^1CO$ is a linear saturated aliphatic acyl group, or a combination thereof, having from about 6 to about 22 carbon atoms, EO is $-CH_2CH_2O-$, PO is $-CH_2CH(CH_3)O-$ or $-CH(CH_3)CH_2O-$ or a combination thereof, where the acyl radical is bonded to a carbon atom of the EO or PO radical, and x=0 to about 5, y=about 0 to about 5, the sum of x and y is equal or greater than 0.5, z=1 to about 5, and (x+y)z is less than or equal to 6. It is to be understood that x, y, and z are average values for the composition.

25 Claims, 9 Drawing Sheets

VOC-FREE COALESCING AGENT

This application claims the benefit of U.S. Provisional Application No. 61/116,735, filed Nov. 21, 2008, and is incorporated herein by reference in its entirety.

BACKGROUND

Aqueous dispersions and emulsions of water-insoluble polymers for use as paints, sealants, caulks, adhesives or other coatings are well-known, widely-used articles of commerce. The effectiveness of the dispersion in forming a film after the polymer dispersion has been deposited upon a surface depends upon the glass transition temperature of the dispersed polymer and the temperature at which the film is allowed to form.

Coalescent aids have been used in such aqueous dispersions to soften, i.e., plasticize, ideally temporarily, the dispersed polymer phase and facilitate the formation of a continuous film with optimum film properties once the water has evaporated. In addition to increasing the ease of film formation, the coalescent aid also promotes subsequent improvements in film properties by coalescing the water-insoluble polymers and forming an integral film at ambient temperatures. Without the coalescent aid, the films may crack and fail to adhere to the substrate surface when dry.

Coalescent aids, also known as coalescing solvents or simply coalescents, are particularly helpful in assisting in film formation at temperatures below the glass transition temperature of the dispersed polymer.

Various alcohol esters and ether alcohols have been proposed for use as coalescent aids. For example, in U.S. Pat. No. 4,131,580 Emmons et al. disclose water-based coating compositions based on vinyl addition polymers of monoethylenically unsaturated monomers which comprise dicyclopentenyl acrylate and/or dicyclopentenyl methacrylate as a coalescent aid. In U.S. Pat. No. 4,141,868, Emmons et al. suggest certain ester-ether compounds be used instead.

Two of the more widely used coalescent aids are ethylene glycol monobutyl ether (Butyl CELLOSOLVE®, Dow Chemical) and 2,2,4-trimethyl-1,3 pentanediol monobutyrate (TEXANOL®, Eastman Kodak). While Butyl CELLOSOLVE® and TEXANOL® are useful in facilitating film formation of coatings formulated with water insoluble polymers with high glass transition temperatures and are even useful in facilitating film formation of coatings with low glass transition temperatures if they are being applied at a temperature that is lower than ambient temperature which is higher than the glass transition temperature of the coating, they are relatively volatile and, as a result, are currently classified as VOCs (volatile organic compounds) in the US.

SUMMARY

According to some embodiments, the present invention includes a film-forming composition including a coalescent aid which comprises fatty acid esters of ethylene glycol and/or propylene glycol of Formula I:

$$R^1COO[(EO)_x(PO)_y]_zH \qquad I$$

wherein $R^1CO$ is a linear saturated aliphatic acyl group, or a combination thereof, having from about 6 to about 22 carbon atoms, EO is $-CH_2CH_2O-$, PO is $-CH_2CH(CH_3)O-$ or $-CH(CH_3)CH_2O-$ or a combination thereof, where the acyl radical is bonded to a carbon atom of the EO or PO radical, and x=0 to about 5, y=about 0 to about 5, the sum of x and y is equal or greater than 0.5, z=1 to about 5, and (x+y)z is less than or equal to 6. It is to be understood that x, y, and z are average values for the composition.

In some embodiments, a film-forming composition includes one or more additives selected from wetting aids, dispersants, thickeners, defoaming agents, algicides, ultraviolet inhibitors, flow agents, leveling agents, rheology modifiers, freeze thaw stabilizing agents, pH modifiers, flash rust inhibitors, and biocides. The film-forming composition may also include pigments to impart hiding and/or color, and fillers such as talc, calcium carbonate, or clays.

In some embodiments, the film-forming composition comprises a mixture of coalescent aids and the fatty acid ester of Formula I is at least about 5 wt. % of the mixture. In other embodiments, the fatty acid ester of Formula I is greater than 50% of the coalescent aids. In a further embodiment, the fatty acid ester of Formula I comprises all of the coalescent aid. In certain embodiments, the film-forming composition contains at least about 20 wt. % water. In some embodiments, the film-forming composition contains at least about 20 wt. % water, at least about 10 wt. % dispersed polymer, and the weight of the fatty acid ester of Formula I is about 0.1% to about 50% of the weight of the dispersed polymer.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

In the drawings.

DETAILED DESCRIPTION

Figure 1:
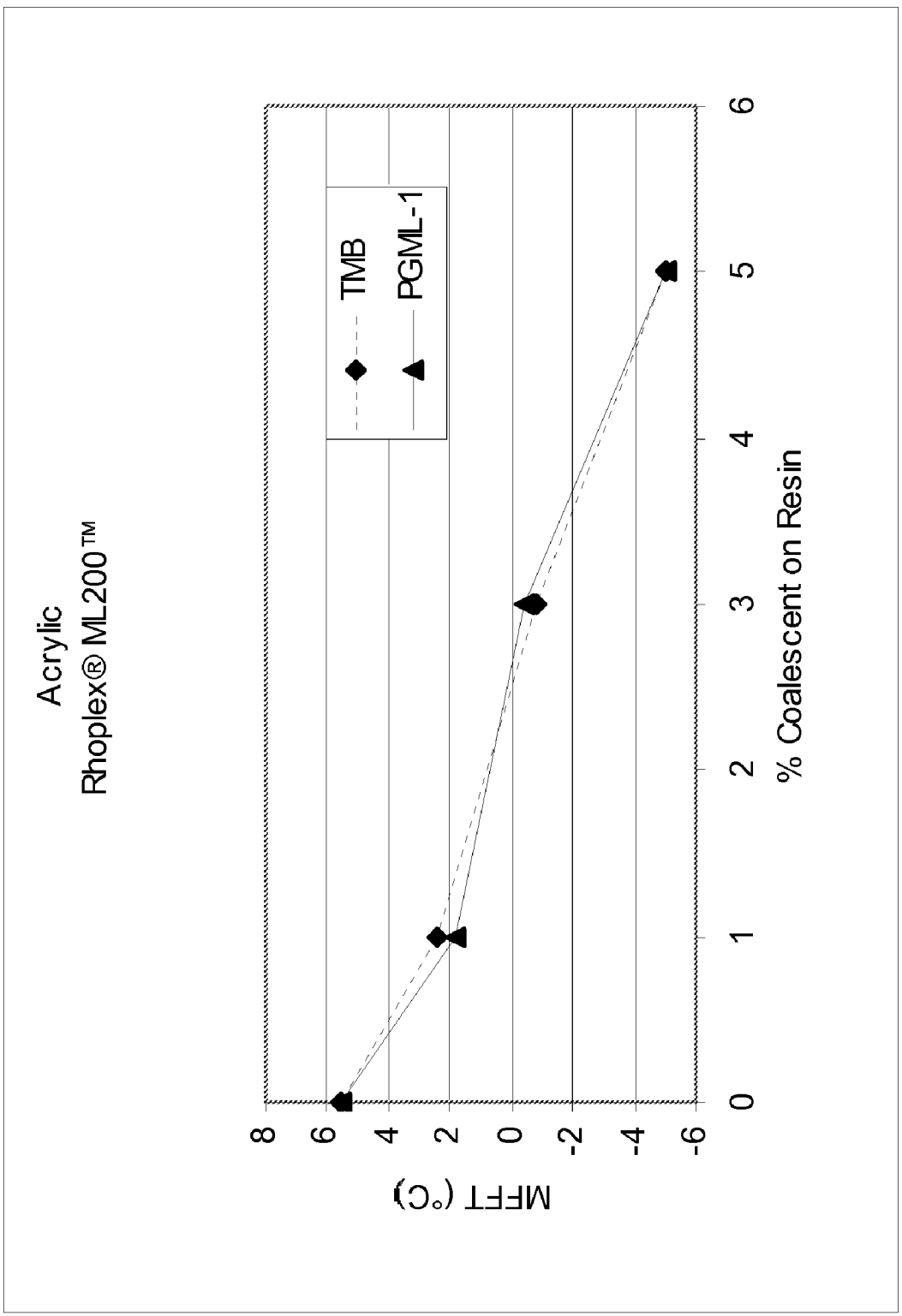
FIG. 1 illustrates the change in minimum film forming temperature as a function of coalescent concentration for an inventive composition and prior art composition.

The water-based film-forming compositions of the present invention generally contain a continuous aqueous phase and a polymeric film-forming phase. In general, they may be formulated to function as paint, sealant, caulk, adhesive or other coating. Thus, these film-forming compositions may have a wide range of viscosities, e.g., from about 50 to about 100, 000 centipoise; paints, sealants and similar coatings typically have a viscosity from about 50 to about 10,000 centipoise, caulks typically have a viscosity from about 5,000 to about 1,000,000 centipoise, and adhesives typically have a viscosity from about 50 to about 50,000 centipoise. In addition, adhesives are formulated for cohesive strength as well as good contact with the substrate upon which the film-forming composition is deposited. As used herein, a water-based film-forming polymer means a film-forming polymer which is dissolved, dispersed or emulsified in water.

In some embodiments, the continuous aqueous phase comprises at least about 10 wt % water with the amount of water depending upon the application. For example, in some embodiments paints, sealants and similar coating compositions have at least about 10 wt % water and may contain about 20 wt % to about 80 wt % water with differing amounts being used for textured, high gloss, semi-gloss, flat, etc. coatings. In some embodiments, caulks have at least about 10 wt % water and may contain about 10 wt % to about 50 wt % water with differing amounts being used for different caulk applications. In certain embodiments, adhesives range from about 10 wt % to about 80 wt % water and may contain about 40 wt % to about 60 wt % water with differing amounts being used for different adhesive applications.

The continuous aqueous phase may optionally include one or more water-soluble volatile organic solvents, i.e., substituted hydrocarbon solvents. For the purposes of this application, volatile organic solvents shall be defined as those that have a boiling point of about 250° C. or less, or a boiling range beginning at about 250° C. or less. For example, in some embodiments 3-5 wt. % of ethylene glycol or another glycol may be included for freeze-thaw protection. In some embodiments, the proportion of water-soluble volatile organic solvents is minimized; that is, the continuous aqueous phase may contain less than about 20 wt. % volatile organic solvent, less than about 10 wt. % volatile organic solvent, or less than about 5 wt. % volatile organic solvent, based upon the weight of the continuous aqueous phase and exclusive of any amount which may be present in a micelle or other dispersed phase or material. To meet increasingly stringent environmental regulations, the volatile organic solvent content is negligible, less than about 0.1 wt %, in some embodiments.

In some embodiments, the dispersed phase comprises a water-based film-forming polymer and, optionally, one or more additives. In certain embodiments, the dispersed phase, including the water-based film-forming polymer, constitutes no more than about 90 wt % of the film forming composition with the amount of dispersed phase depending upon the application. In some embodiments, paints, sealants and similar coating compositions have no more than about 90 wt % dispersed phase and may contain about 20 wt % to about 80 wt % dispersed phase with differing amounts being used for textured, high gloss, semi-gloss, flat, etc. coatings. In some embodiments, caulks have no more than about 90 wt % dispersed phase and may contain about 75 wt % to about 90 wt % dispersed phase with differing amounts being used for different caulk applications. In some embodiments, adhesives range from about 20 wt % to about 90 wt % dispersed phase and may contain about 40 wt % to about 60 wt % dispersed phase with differing amounts being used for different adhesive applications.

In some embodiments, the dispersed polymer is insoluble in the aqueous phase and is otherwise suitable for use in water borne film-forming compositions. Because in some embodiments the dispersed polymer is the component which coalesces to form the desired film, the film-forming composition may comprise at least about 10 wt. %, at least about 15 wt. %, and some applications at least about 20 wt. % of a coalescible dispersed polymer.

According to some embodiments of the present invention, suitable dispersed polymers are generally of high molecular weight (e.g., greater than about 60,000 Daltons for a typical film-forming latex resin). For example, in some embodiments they may be either of the addition type, in particular a polymer or copolymer of one or more $\alpha,\beta$-ethylenically unsaturated monomers, or of the condensation type, for example, a polyester or a polyamide. Suitable water-based film-forming polymers of the addition type may include the polymerization and copolymerization products of styrene, vinyl acetate, vinyl toluene, vinyl chloride, vinylidene chloride, butadiene, vinyl hydrocarbons, acrylonitrile, acrylic acid and esters thereof (hereinafter "acrylates"), and methacrylic acid and esters thereof (hereinafter "methacrylates") containing monomers. Suitable condensation type water-based film-forming polymers may include epoxy, urethane, hydrocarbon, silicone, nitrocellulose, polyester, and alkyd polymers. In certain embodiments, particularly suitable water-based film-forming polymers include acrylates, methacrylates, styrene and vinyl acetate and mixtures thereof. Examples of suitable water-based film-forming polymers include the polymerizates or copolymerizates of one or more of the following: acrylates such as ethyl acrylate, butyl acrylate, 2-ethylhexyl acrylate, as well as other acrylates, methacrylates, styrene and vinyl acetate. In some embodiments, the water-based film-forming polymer comprises a latex formulation.

In some embodiments, the film forming compositions are comprised of thermoplastic polymers; in these compositions, films may be formed by evaporation of the water. In other embodiments, the film forming compositions are comprised of crosslinkable formulations; these formulations may be comprised of crosslinking agents and water-based film-forming polymers or self-crosslinking water-based film-forming polymers.

In some embodiments, polymers dispersed as very small particles are more readily coalesced than polymers dispersed as larger particles. Accordingly, in some embodiments, dispersed polymers have a particle size of about 3 micrometers or less. For example, for latex resins, in some embodiments approximately 90 wt. % of the latex particles will have a size less than about 0.2 micrometers.

The film forming composition further comprises a coalescent aid (or solvent) which may be in the continuous phase, the dispersed phase, or partitioned between them.

In some embodiments, the coalescent aid of this invention is used in latex, also known as emulsion systems. In some embodiments, these coalescent aids may also find application in other systems such as those based on but not limited to alkyds, epoxies, nitrocellulose, and urethanes.

In some embodiments, the amount of coalescent aid needed to assist in film formation depends on the viscosity of the film-forming composition, the temperature at which the composition is being applied, the glass transition temperature of the film-former, and the minimum film formation temperature of the film-former. In certain embodiments, the amount of coalescent will be proportional to the amount and type of water-based film-forming polymer used with ratios in the range of about 0.1 wt % to about 50 wt. % (based upon the weight of the dry film forming polymer), about 0.1 wt % to about 40 wt. % (based upon the weight of the dry film forming polymer), about 0.1 wt % to about 25 wt. % (based upon the weight of the dry film forming polymer), about 0.1 wt % to about 15 wt. % (based upon the weight of the dry film forming polymer), about 0.1 wt % to about 10 wt. % (based upon the weight of the dry film forming polymer), or about 1 wt. % to about 4 wt. % range (based upon the weight of the dry film forming polymer).

As noted above, the coalescent aid may be in the continuous phase, in the dispersed phase, or partitioned between the two. Depending upon the type and amount of surfactants included in the film-forming composition, a fraction of the fatty acid ester coalescent aid may additionally be emulsified in the continuous aqueous phase and found in micelles along with surfactant.

The film-forming composition of the present invention may also contain various conventional additives which may be in the dispersed and/or continuous phases. Such additives may include but are not limited to thickening agents such as hydroxyethyl cellulose sold by Aqualon under the trade designation Natrasol 250 and thickeners sold under the trade designation RHEOLATE® associative thickeners by Elementis Specialties, pH modifiers such as ammonium hydroxide and N,N-dimethyl ethanolamine, defoaming agents such as mineral oil or silicone oils, wetting agents such as a nonionic surfactant sold by AKZO under the trade designation Interwet 43 and a nonionic surfactant sold by Dow Chemical under the trade designation Triton X-100, algicides such as organotin compounds and tetrachloroisophthalonitrile, fungicides such as tributyl tin oxide, and 3-iodo-2-propynyl butyl carbamate, dispersants such as lecithin and an anionic dispersant sold under the trade designation Busperse 39 by Buckman, ultraviolet inhibitors such as a benztriazol UV inhibitor sold under the trade designation Tinuvin 328 by Ciba-Geigy and a hindered amine UV inhibitor sold under the trade designation by Tinuvin 123 by Ciba-Geigy, flow and leveling agents such as a polyacrylate sold under the trade designation Byk 354 by Byk-Chemie and a polysiloxane copolymer sold under the trade designation Byk 310 by Byk-Chemie, flash rust inhibitors such as an inhibitor sold under the trade designation Raybo 63 by Raybo or a barium metaborate rust inhibitor sold under the trade designation Busan 11M1 by Buckman, and freeze/thaw inhibitors such as ethylene glycol. Additional additives may include driers such as cobalt driers carboxylate salts (0.0 to 0.15 wt. % Co based on the coalescent aid) and manganese driers carboxylate salts (0.0 to 0.15 wt. % based on the coalescent aid), accelerators such as 1,10-phenanthroline (0 to 0.2% based on the coalescent aid) and 2,2-bipyridine (0 to 0.2% based on the coalescent aid), and anti-skinning agents such as butanone oxime (0.1 lb/100 gal formulation). When present and depending upon the application for the film-forming composition, in some embodiments these additives will not constitute more than about 10 wt. % of the film-forming composition and may constitute about 3 wt. % to about 10 wt. % of the film-forming composition.

In some embodiments, the film forming compositions of this invention will contain pigments or dyes (ink application) to impart hiding and color to the applied film, and/or fillers such as talc, calcium carbonate, kaolin clays, etc.

The film-forming composition may be formed by conventional methods used to prepare paints, adhesives, except that the ester of the present invention is substituted, at least in part, for a conventional coalescent aid. The resulting film-forming composition may easily be applied conventionally using a brush, roller, air or airless spray or like means and requires no unusual methods of drying to form the desired film. Thus, films formed from the composition of the present invention may be dried under ambient conditions or baked at elevated temperature. Furthermore, the film-forming composition may be applied to a variety of materials.

Fatty Acid Esters

Accordingly, the present invention relates to coalescent aids including fatty acid esters of propylene glycol corresponding to Formula (I):

$$R^1COO[(EO)_x(PO)_y]_zH \quad\quad (I)$$

in which $R^1CO$ is a linear or branched, saturated aliphatic acyl group, EO is —$CH_2CH_2O$—, PO is —$CH_2CH(CH_3)O$— or —$CH(CH_3)CH_2O$— or a combination thereof, where the acyl radical is bonded to a carbon atom of the EO or PO radical, and x=0 to about 5, y=about 0 to about 5, the sum of x and y is equal or greater than 0.5, z=1 to about 5, and (x+y)z is less than or equal to 6. It is to be understood that x, y, and z are average values for the composition. In one such embodiment, $R^1$ contains 6 to 22 carbon atoms. In another such embodiment, $R^1$ contains 9 to 15 carbon atoms, In some other such embodiment, $R^1$ comprises at least about 80% $C_{11}$-$C_{13}$; at least about 90% $C_{11}$-$C_{13}$; at least about 95% $C_{11}$-$C_{13}$; or at least about 98% $C_{11}$-$C_{13}$.

In some embodiments, x=0, y=n, and z=1, resulting in fatty acid esters of propylene glycol corresponding to Formula (II):

$$R^1COO(PO)_nH \quad\quad (II)$$

in which $R^1CO$ has the same meaning as defined for Formula (I), PO stands for —$CH_2CH(CH_3)O$— and/or —$CH(CH_3)CH_2O$—, where the acyl radical is bonded to a carbon atom of the EO or PO radical, and n is a number from 0.5 to 5. In some embodiments, n is a number from 0.8 to 1.

These coalescent aids of Formulas (I) or (II) may be prepared either by esterification of the fatty acids with the appropriate glycol or preferably by ethoxylation, propoxylation or propoxylation/ethoxylation of fatty acids. The acids may be derived from natural or synthetic sources. Suitable natural sources include naturally occurring oils such as palm oil, palm kernel oil, coconut oil, and other such oils. The desired fatty acids may also be obtained as a minor fraction from other naturally occurring oils.

The fatty acid ester of Formulas (I) or (II) may be prepared by ethoxylation, propoxylation or ethoxylation/propoxylation reactions of $R^1COOH$ wherein the reactions are carried out in the presence of a catalyst. Suitable catalysts include, for instance: basic catalysts such as sodium and potassium hydroxides and alkoxides, amines; alkanolamines including but not limited to monoethanolamine, diethanolamine and triethanolamine; acids such as mineral acids including hydrochloric acid and sulfuric acid, and Lewis acids such as chromium carboxylates, stannic chloride and boron trifluoride. In some embodiments, the alkanolamines are used in quantities of 0.1 to 5% by weight and in quantities of 0.5 to 3.0% by weight, based on the fatty acids. Synthesis of a fatty acid ester is described in U.S. Pat. No. 6,300,508, which is herein incorporated by reference in its entirety. In certain embodiments, the ethoxylation and/or propoxylation reactions are carried out using a phosphorus-containing catalyst, still more preferably a phosphine, and most preferably triphenylphosphine.

The ethoxylation, propoxylation and/or ethoxylation/propoxylation reaction may be carried out in a known manner. The fatty acid and the catalyst may be introduced into a stirred autoclave which is freed from traces of water before the reaction by alternate evacuation and purging with nitrogen. The fatty acid may then be reacted with the ethylene oxide, propylene oxide or with the ethylene oxide/propylene oxide mixture in a molar ratio of 1:0.5 to 1:5 which may be introduced into the autoclave in portions through a siphon tube after heating. The fatty acids may be reacted with less than or equal to 5 moles of ethylene oxide or propylene oxide or with less than or equal to 6 moles of the mixture of ethylene oxide and propylene oxide. The reaction may be carried out at temperatures of 80 to 180° C. or in some embodiments 100 to 160° C. under autogenous pressures of 1 to 5 bar and in some embodiments 2 to 3 bar. After the reaction, the reaction mixture may be stirred for a certain time (15-90 mins.) at the reaction temperature in order to complete the reaction. The autoclave may then be cooled, vented and, if desired, acids, for example, lactic acid or phosphoric acid, may be added to the product to neutralize the basic catalyst.

In certain embodiments, the fatty acid ester component comprises about 80% of the reaction mixture, about 90% of the reaction mixture, about 95% of the reaction mixture, or about 99% of the reaction mixture. In some embodiments, the ester component of the reaction mixture comprises about 80%, about 90%, about 95%, or about 99% of the monoester (i.e., formula (I) or (II)) of the analogous glycol. In certain embodiments, the diester content (that is, the product in which both hydroxyls of the glycol are esterified) is less than about 10%, less than about 5%, or less than about 3% of the coalescent aid. Achieving such levels of di-ester and monoester may be accomplished by fractional distillation of the reaction product and/or by judicious selection of the reaction conditions, including catalyst selection.

In some embodiments, the coalescent aid may contain the starting fatty acid at concentrations of up to about 50 wt %; up to about 40 wt %; up to about 30 wt %; up to about 20 wt %; up to about 15 wt %; up to about 10 wt %; up to about 5 wt %; or up to about 1 wt %.

In some embodiments, the coalescent aid contains a diester. The diester may be of the formula $R^1COO[(EO)_x(PO)_y]_zCOOR^1$. In some such embodiments, the coalescent aid contains less than about 1% diester; less than about 3% diester; less than about 5% diester; less than about 10% diester; or less than 20% diester.

EXAMPLES

Synthesis and Purification of Propylene Glycol Monolaurate

Propylene Glycol Monolaurate (PGML) was prepared by three different methods as described below. The products were analyzed by Gas Chromatography (GC). The relative amounts of residual Lauric acid, PGML and Propylene Glycol Dilaurate (PGDL) were estimated based on peak areas.

The PGML-1 used in Examples 1-7 was obtained from the direct esterification of Lauric Acid with propylene glycol. The product was vacuum distilled to obtain the purified propylene glycol monolaurate. GC analysis showed the product to be 96% pure and free of Propylene Glycol Dilaurate. The material was prepared as follows:

A 250 mL 4-neck flask was fitted with a Dean/Stark trap and condenser, a thermocouple, a nitrogen inlet and outlet, and a magnetic stir bar. 77.5 grams of Lauric Acid (98%, TCI America) and 117.8 grams of 1,2-propanediol (99%, Aldrich) were added to the flask. 0.37 grams of p-toluene sulfonic acid monohydrate (TCI America) was then added and the solution placed under a nitrogen atmosphere. The solution was heated to 125° C. Five 10 mL portions of dry toluene were added over 40 minutes. The toluene was allowed to co-distill with water. The temperature was then raised to 156° C. over 2 hours at which point a vigorous reflux began. After collecting an additional 9 mL of distillate, the reaction was cooled. Base titration (KOH/MeOH) indicated less than 1% unreacted Lauric acid. The solution was diluted with 200 mL of cyclohexane and neutralized with 2 grams of sodium bicarbonate in 100 mL of water. The solution was further washed with 2×100 mL of water and dried over $MgSO_4$ (anhydrous). The solvent was removed on a rotary evaporator to give 100 grams of a clear, light brown liquid. GC analysis showed the product to consist mainly of propylene glycol monolaurate (70%) and propylene glycol dilaurate (30%). Propylene Glycol Monolaurate was obtained by fractional distillation of this crude product (113° C. @ 18 microns Hg).

The PGML-2 used in Examples 8 and 12 was obtained by fractional distillation of the crude product resulting from the base catalyzed reaction of propylene oxide and lauric acid. It contains 94% PGML and 6% Lauric Acid. The catalyst was potassium laurate, generated in situ from lauric acid and potassium methoxide. The crude product was prepared as follows:

A 5 L autoclave was charged with 590 grams lauric acid and 3.4 grams Potassium methanolate (32.5% active content). The vessel was sparged with nitrogen and heated to 160° C. for 30 minutes to remove all methanol. 175 grams of propylene oxide (PO) were added over 40 minutes at 155-160° C. while keeping the pressure below 5 bar. After addition of all PO, the reaction mixture was heated for 1 hour. Any unreacted propylene oxide was removed via a Nitrogen sparge with a vacuum of 330 mbar. The end product had an acid value of 8.4 mg KOH/g.

The PGML-3 used in Examples 9-11 and 13-14 was obtained from the triphenylphosphine catalyzed reaction of propylene oxide and lauric acid: A 5 L autoclave was charged with 750 grams lauric acid and 3.75 grams TPP. The vessel was sparged with nitrogen while maintaining 300 mbar of vacuum. The vessel was heated to 105° C. and maintained at these conditions for 1 hour to remove any water. 220 grams of propylene oxide (PO) were added over 40 minutes at 100-110° C. while keeping the pressure below 3.3 bar. After all of the PO was added, the reaction was heated for 5.30 hours until an acid value of approximately 5-10 mg KOH/g was obtained. Any unreacted propylene oxide was removed via a Nitrogen sparge with a vacuum of 330 mbar. GC Analysis showed the reaction product consisted of 94% PGML, 1.3% PGDL, and 3.5% Lauric Acid.

Performance of Propylene Glycol Monolaurate in Acrylic, Vinyl Acrylic and Styrene Acrylic Resins and Paints: Gloss and Minimum Film Formation Temperature

Example 1

Effect of Propylene Glycol Monolaurate (PGML-1, Distilled) on Gloss in an Acrylic Resin To a 4 oz. straight-sided polypropylene jar, 50 grams of Rhoplex® ML200™ was added. The latex was agitated using a Dispermat® CV high speed disperser fitted with a 30 mm high shear impeller. The disperser was run at a sufficient speed to maintain a vortex in the latex. To the latex 1.34 g of coalescent was added in a dropwise fashion. The blend was mixed for an additional 5 minutes and then allowed to equilibrate for at least 16 hours.

Approximately 2-3 grams of the coalescent/latex blend was added to one end of a byko-chart scrub-test panel (P121-10N). Immediately adjacent to this blend was added a control resin blend in which Texanol® (2,2,4-trimethyl-1,3-pentanediol monobutyrate) was used as the coalescent. Using a 3 mil wet film applicator, the material was drawn down at a constant rate. The films were allowed to dry for 16-hours in a constant temperature/humidity cabinet (25° C. @ 50% humidity). A 20° and 60° gloss measurement was made using a Novo-Gloss gloss meter (GARDCO). An average of 3 readings were recorded for both the experimental and control film.

The results were recorded in Table 1 for these films. The results indicated that propylene glycol monolaurate is as effective as Texanol® in improving the gloss of a film for this acrylic resin.

TABLE 1

Gloss Readings for Films Prepared from Coalescent/Acrylic Resin Blends*

| Reference | Coalescent | Gloss Readings 20° | 60° |
|---|---|---|---|
| PGML-1 | Texanol ® | 61 | 83 |
|  | Propylene Oxide ester of Lauric Acid (distilled) | 62 | 84 |

*5 wt % coalescent on resin solids. Film thickness: 3 mil.
*Resin: Rhoplex ® ML200 ™. 54 wt % solids, available from Rohm & Haas
*Tg of Resin = 9° C. Minimum Film Formation Temperature of Resin: 7° C.

Example 2

Effect of Propylene Glycol Monolaurate (PGML-1, Distilled) on Gloss in a Vinyl Acrylic Resin A resin blend was prepared by mixing 1.93 g of coalescent with 50 g of UCAR 379G™ in the manner described in Example 1. As in Example 1, films were prepared and the gloss of these films was measured. The results are reported in Table 2. The results show that propylene glycol monolaurate performs as well or better than the Texanol® control in this vinyl acrylic resin.

TABLE 2

Gloss Readings for Films Prepared from Coalescent/Vinyl Acrylic Resin Blends*

| Reference | Coalescent | Gloss Readings 20° | 60° |
|---|---|---|---|
| PGML-1 | Texanol ® | 67 | 85 |
|  | Propylene Glycol Monolaurate (distilled) | 70 | 85 |

*7 wt % coalescent on resin solids. Film thickness: 3 mil.
*Resin: UCAR 379G ™. 55 wt % solids; available from Dow Chemical
*$T_g$ of Resin = 19° C. Minimum Film Formation Temperature of Resin: 12° C.

Example 3

Effect of Propylene Glycol Monolaurate (PGML-1, Distilled) on Gloss in a Styrene Acrylic Resin A resin blend was prepared by mixing 3.15 g of coalescent with 50 g of Arolon® 847-W-42 in the manner described in Example 1. As in Example 1, films were prepared and the gloss of these films was measured. The results are reported in Table 3. The results show that propylene glycol monolaurate performs as well or better than the butyl Cellosolve® control in this styrene acrylic resin.

TABLE 3

Gloss Readings for Films Prepared from Coalescent/Styrene-Acrylic Resin blends*

| Reference | Coalescent | Gloss Readings 20° | 60° |
|---|---|---|---|
| PGML-1 | Butyl Cellosolve ® | 58 | 91 |
|  | Propylene Glycol Monolaurate (distilled) | 75 | 93 |

*15 wt % coalescent on resin solids. Film thickness: 3 mil.
*Resin: Reichold Arolon ® 847-W-42. 42 wt % solids.
*$T_g$ of Resin = 23° C. Minimum Film Formation Temperature of Resin: 20° C.

Example 4

Effect of Propylene Glycol Monolaurate (PGML-1, Distilled) on Gloss in an Acrylic Paint An Acrylic masterbatch was prepared as described below. To 57.4 g of this masterbatch was added 0.47 g of Propylene Glycol Monolaurate in a manner similar to that described in Example 1. As in Example 1, films were prepared and the gloss of these films was measured. The results are reported in Table 4. The results show that propylene glycol monolaurate performs as well or better than the Texanol control in this acrylic paint.

| Rhoplex ® ML200 ™ Masterbatch: Quality Exterior Flat Formula | | | |
|---|---|---|---|
| Raw Material | Pounds | Gallons | Weight % |
| Water | 117.00 | 14.06 | 10.11 |
| Natrosol 250 MHR | 4.90 | 0.42 | 0.42 |
| Ammonium hydroxide | 2.20 | 0.29 | 0.19 |
| Add to water, mix and hydrate - then add while mixing: | | | |
| Ethylene Glycol | 25.00 | 2.69 | 2.16 |
| Propylene Glycol | 35.00 | 3.76 | 3.02 |
| Tamol 1124 | 6.80 | 0.69 | 0.59 |
| Triton CF10 | 1.00 | 0.11 | 0.09 |
| BYK 022 | 2.00 | 0.24 | 0.17 |
| Add slowly to vortex - HSD to 5 Hegman | | | |
| TiPure R706 | 225.00 | 6.75 | 19.45 |
| Minex 4 | 160.00 | 7.38 | 13.83 |
| Iceberg | 50.00 | 2.28 | 4.32 |
| Letdown: RM and water holdout for adjustment: | | | |
| Rhoplex Mulitlobe 200 | 350.00 | 39.33 | 30.25 |
| Drew Plus L 475 | 2.00 | 0.26 | 0.17 |
| Water | 166.90 | 20.06 | 14.42 |
| Coalescent* | 9.30 | 1.18 | 0.80 |
| TOTAL | 1157.10 | 99.51 | 100.00 |
| Raw Material | Description | Supplier | |
| Water | | | |
| Natrosol ® 250 MHR | cellulosic thickener | Hercules | |
| Ammonium hydroxide | buffer | | |
| Ethylene Glycol | glycol | | |
| Propylene Glycol | glycol | | |
| Tamol ™ 1124 | dispersant | Rohm & Haas | |
| Triton ™ CF10 | surfactant | Dow | |
| BYK ® 022 | defoamer | BYK-Chemie | |
| TiPure ® R706 | titanium dioxide | DuPont | |
| Minex ® 4 | extender | Unimin Burgess | |

-continued

| Rhoplex ® ML200 ™ Masterbatch: Quality Exterior Flat Formula | | |
|---|---|---|
| Iceberg Rhoplex ® Mulitlobe ™ 200 | extender acrylic resin | Pigment Rohm & Haas |
| Drewplus ® L 475 | defoamer | Drew Industrial |

*held out

TABLE 4

Gloss Readings for Films Prepared from Coalescent/Acrylic Masterbatch Blends*

| | | Gloss Readings | |
|---|---|---|---|
| Reference | Coalescent | 20° | 60° |
| PGML-1 | Texanol ® Propylene Glycol Monolaurate (distilled) | 2 2 | 4 4 |

*5 wt % coalescent on resin solids. Film thickness: 3 mil.
*Resin: Rhoplex ® ML200 ™
*Tg of Resin = 9° C. Minimum Film Formation Temperature of Resin: 7° C.

Example 5

Effect of Propylene Glycol Monolaurate (PGML-1, Distilled) on Gloss in a Vinyl Acrylic Paint A Vinyl Acrylic masterbatch was prepared as described below. To 52.0 g of this masterbatch was added 1.0 g of Propylene Glycol Monolaurate in a manner similar to that described in Example 1. As in Example 1, films were prepared and the gloss of these films was measured. The results are reported in Table 5. The results show that propylene glycol monolaurate performs as well or better than the Texanol control in this vinyl acrylic paint.

| Vinyl Acrylic UCAR 379G ™ Masterbatch Semigloss Enamel Formula | | | |
|---|---|---|---|
| Raw Material | Pounds | Gallons | Weight % |
| Water | 268.20 | 32.24 | 25.30 |
| Cellosize ER-15,000 | 2.00 | 0.18 | 0.19 |
| Nuosept 95 | 2.40 | 0.25 | 0.23 |
| AMP 95 | 1.00 | 0.13 | 0.09 |
| Add to water, mix and hydrate - then add while mixing: | | | |
| Tamol 731A | 9.20 | 1.00 | 0.87 |
| Triton N-57 | 2.10 | 0.25 | 0.20 |
| Propylene Glycol | 43.20 | 4.65 | 4.08 |
| BYK 035 | 1.00 | 0.14 | 0.09 |
| Add slowly to vortex - HSD to 5 Hegman: | | | |
| TiPure R706 | 250.00 | 7.50 | 23.59 |
| Letdown: RM and water holdout for adjustment: | | | |
| Ucar 379G | 428.40 | 47.34 | 40.42 |
| BYK 035 | 1.90 | 0.26 | 0.18 |
| Propylene Glycol | 10.00 | 1.08 | 0.94 |
| Water | 10.00 | 1.20 | 0.94 |
| Acrysol SCT 275 | 10.00 | 1.20 | 0.94 |
| Triton GR-7M | 0.50 | 0.06 | 0.05 |
| Coalescent* | 20.00 | 2.53 | 1.89 |
| Water | 0.00 | 0.00 | 0.00 |
| TOTAL | 1059.90 | 99.99 | 100.00 |

| Raw Material | Description | Supplier |
|---|---|---|
| Water | | |
| Cellosize ™ ER-15,000 | cellulosic thickener | Dow |
| Nuosept ® 95 | in-can biocide | ISP |
| AMP 95 | buffer | Angus |
| Tamol ™ 731A | dispersant | Rohm & Haas |
| Triton ™ N-57 | surfactant | Dow |
| Propylene Glycol | glycol | |
| BYK ® 035 | defoamer | BYK-Chemie |
| TiPure ® R706 | titanium dioxide | DuPont |
| Ucar ® 379G | vinyl acrylic resin | Dow |
| BYK ® 035 | defoamer | BYK-Chemie |
| Propylene Glycol | glycol | |
| Acrysol ™ SCT 275 | associative thickener | Rohm & Haas |
| Triton ™ GR-7M | surfactant | Dow |

*held out

TABLE 5

Gloss Readings for Films Prepared from Coalescent/Vinyl Acrylic Masterbatch Blends*

| | | Gloss Readings | |
|---|---|---|---|
| Reference | Coalescent | 20 Degrees | 60 degrees |
| PGML-1 | Texanol ® Propylene Glycol Monolaurate (distilled) | 24 28 | 70 72 |

*8.5 wt % coalescent on resin solids. Film thickness: 3 mil.
*Resin: UCAR 379G ™. 55 wt % solids
*Tg of Resin = 19° C. Minimum Film Formation Temperature of Resin: 12° C.

Example 6

Effect of Propylene Glycol Monolaurate (PGML-1, Distilled) on Gloss in a Styrene Acrylic Paint A Styrene Acrylic masterbatch was prepared as described below. To 48.0 g of this masterbatch was added 2.05 g of Propylene Glycol Monolaurate and 1.25 g of water in a manner similar to that described in Example 1. As in Example 1, films were prepared and the gloss of these films was measured. The results are reported in Table 6. The results show that propylene glycol monolaurate performs better than the butyl Cellosolve® control in this styrene acrylic paint.

| Styrene Acrylic Arolon ® 847-W-42 Masterbatch White Gloss Enamel Formula | | | |
|---|---|---|---|
| Raw Material | Pounds | Gallons | Weight % |
| Arolon 847-W-42 | 223.59 | 26.24 | 21.80 |
| Tamol 731A | 1.32 | 0.14 | 0.13 |
| Patcote 841 | 1.32 | 0.18 | 0.13 |
| Water | 23.76 | 2.86 | 2.32 |
| Ammonium hydroxide | 3.17 | 0.41 | 0.31 |
| Add slowly to vortex - HSD to 5 Hegman: | | | |

-continued

Styrene Acrylic Arolon ® 847-W-42
Masterbatch White Gloss Enamel Formula

| TiPure R706 | 219.10 | 6.57 | 21.36 |
|---|---|---|---|
| Letdown: RM and water holdout for adjustment: | | | |
| Water | 26.40 | 3.17 | 2.57 |
| Arolon 847-W-42 | 428.43 | 50.29 | 41.78 |
| Water | 26.40 | 3.17 | 2.57 |
| 10% Sodium Nitrite | 6.07 | 0.68 | 0.59 |
| Coalescent* | 41.00 | 5.16 | 4.00 |
| Water* | 25.00 | 3.00 | 2.44 |
| TOTAL | 1025.56 | 101.89 | 100.00 |

| Raw Material | Description | Supplier |
|---|---|---|
| Arolon ® 847-W-42 | styrene acrylic resin | Reichhold |
| Tamol ™ 731A | dispersant | Rohm & Haas |
| Patcote ® 841 | | Hydrite Chemical Co. |
| Water | | |
| Ammonium hydroxide | buffer | |
| TiPure ® R706 | titanium dioxide | DuPont |
| Arolon ® 847-W-42 | styrene acrylic resin | Reichhold |
| 10% Sodium Nitrite | flash rust inhibitor | |

*held out

TABLE 6

Gloss Readings for Films Prepared from Coalescent/Styrene-Acrylic Masterbatch Blends*

| | | Gloss Readings | |
|---|---|---|---|
| Reference | Coalescent | 20° | 60° |
| PGML-1 | Butyl Cellosolve ® | 40 | 78 |
| | Propylene Glycol Monolaurate (distilled) | 61 | 86 |

*15 wt % coalescent on resin solids. Film thickness: 3 mil.
*Resin: Reichold Arolon ® 847-W-42.
*Tg of Resin = 23° C. Minimum Film Formation Temperature of Resin: 20° C.

Example 7

Figure 2:
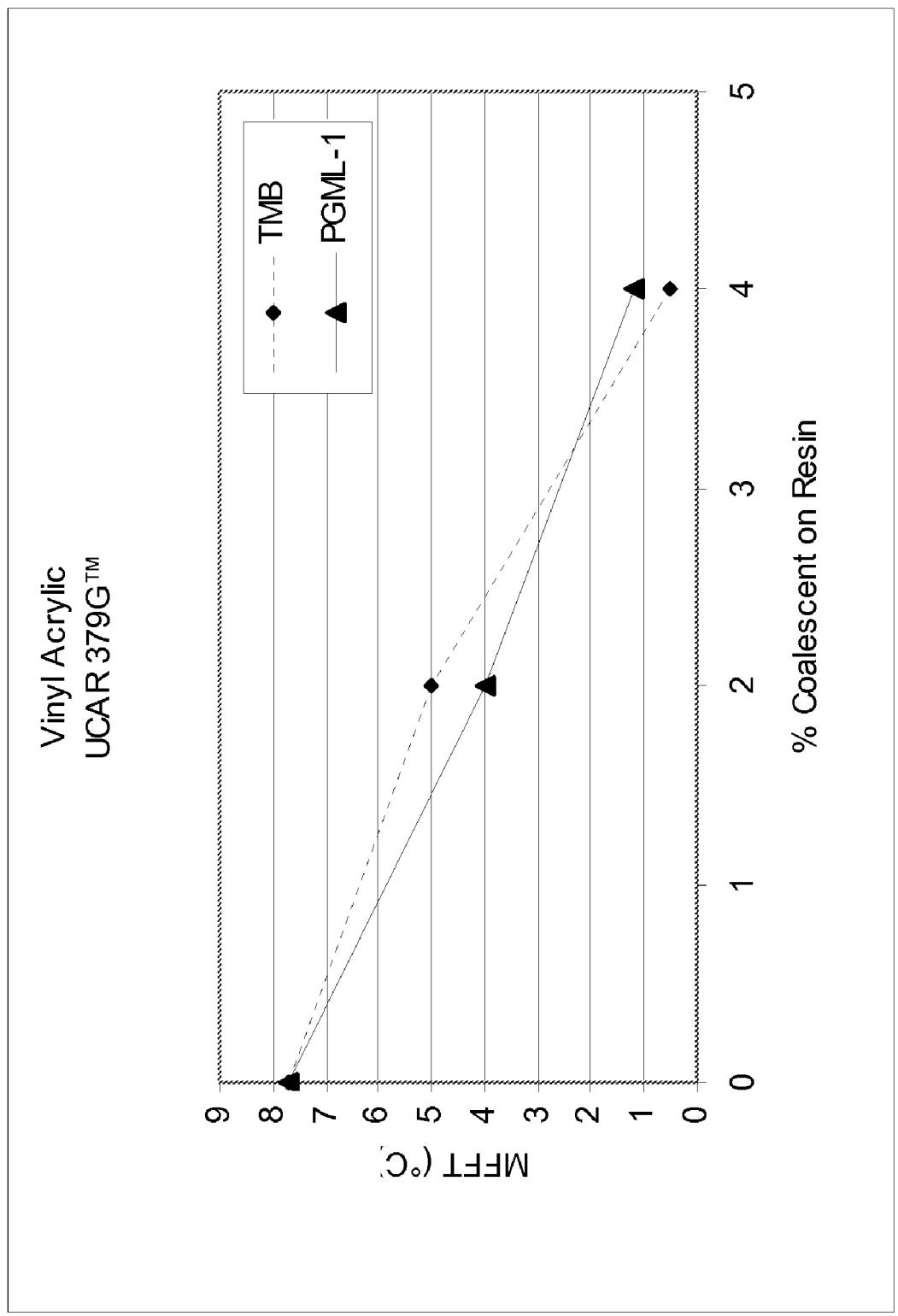
FIG. 2 illustrates the decrease in minimum film forming temperature for an inventive composition and prior art composition.
Figure 3:
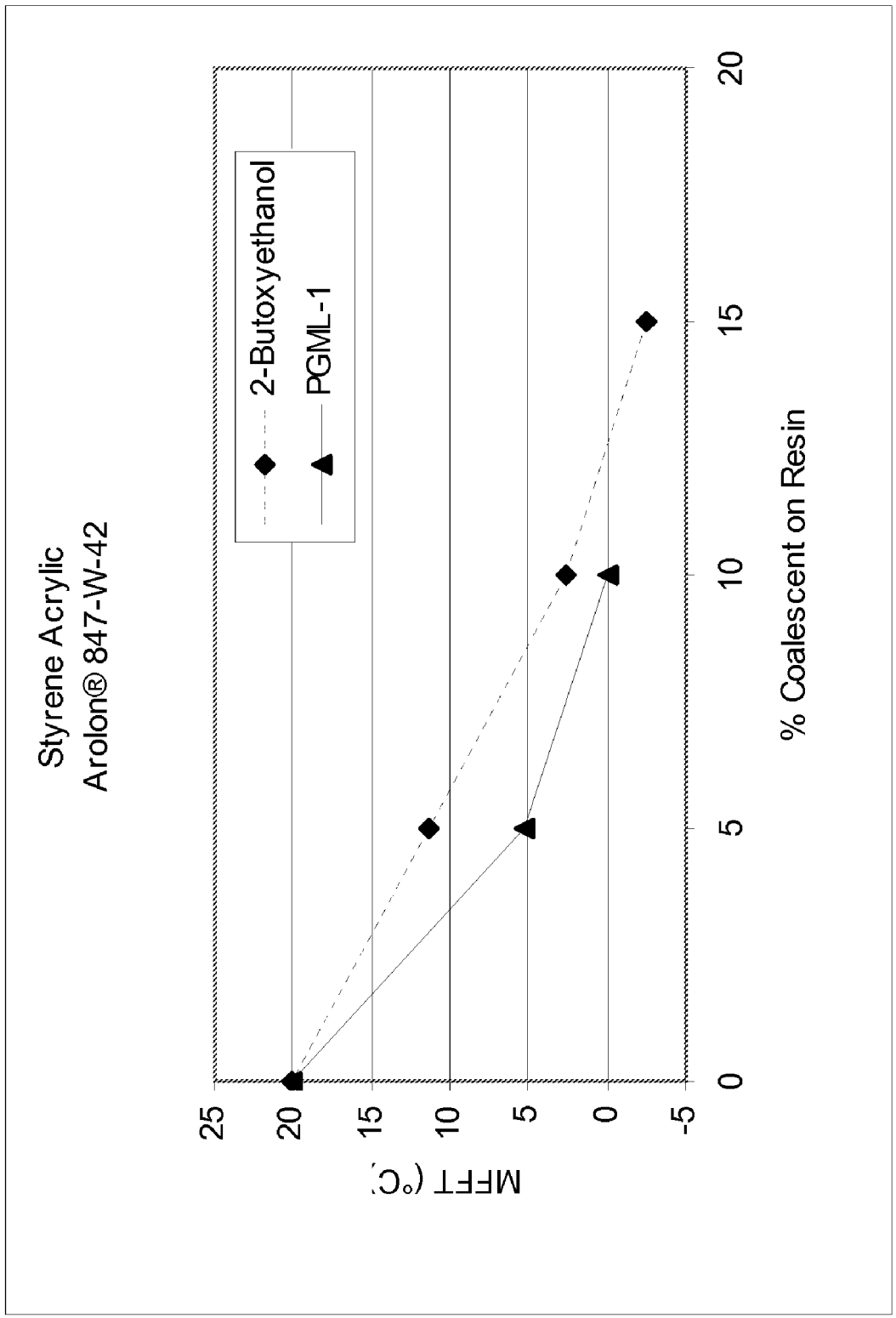
FIG. 3 illustrates the change in minimum film forming temperature as a function of coalescent concentration for an inventive composition and prior art composition.

Effect of Propylene Glycol Monolaurate (PGML-1, Distilled) on the Minimum Film Formation Temperature (MFFT) of Acrylic, Vinyl Acrylic and Styrene Acrylic Resins In a manner similar to Example 1, a series of resin/coalescent blends were prepared with varying levels of coalescent. The blends were allowed to equilibrate for 16 hours. The MFFT of these blends were determined according to ASTM 2354-98 using a Rhopoint MFFT BAR-90. The results of these tests are represented graphically in FIGS. 1-3. The results are compared to either Texanol® (TMB: 2,2,4-trimethyl-1,3-pentanediol mono(2-methylpropanoate) or Butyl Cellosolve®. The results show that Propylene Glycol Monolaurate is of similar efficiency to these commercial coalescents in lowering the MFFT of the resin.

Example 8

Effect of Lauric Acid on Gloss

A series of blends of PGML-2 (distilled, contains 6 wt % Lauric acid) was blended with increasing amounts of Lauric Acid. The mixtures were then added to Acronal Optive® 110 in a manner similar to that described in Example 1. The loading level was 7.7 wt % coalescent blend on resin solids. 3 mil films were prepared and the gloss of these films was measured as described in Example 1. The results are reported in Table 7. The results show that the PGML coalescent may contain up to at least 16 wt % Lauric acid without observing any effect on the gloss of the films prepared from this coalescent and Acronal Optive® 110.

TABLE 7

| | % Lauric Acid in | Gloss | |
|---|---|---|---|
| Reference | Coalescent Blend* | 20° | 60° |
| Ex. 9a | 6 | 71.9 | 87.7 |
| Ex. 9b | 9 | 74.4 | 87.2 |
| Ex. 9c | 11 | 75.4 | 87.9 |
| Ex. 9d | 16 | 75.6 | 87.7 |

*total Lauric acid includes 6 wt % Lauric acid in PGML-2.
**Coalescent = 7.7% on resin solids Example 9

Figure 4:
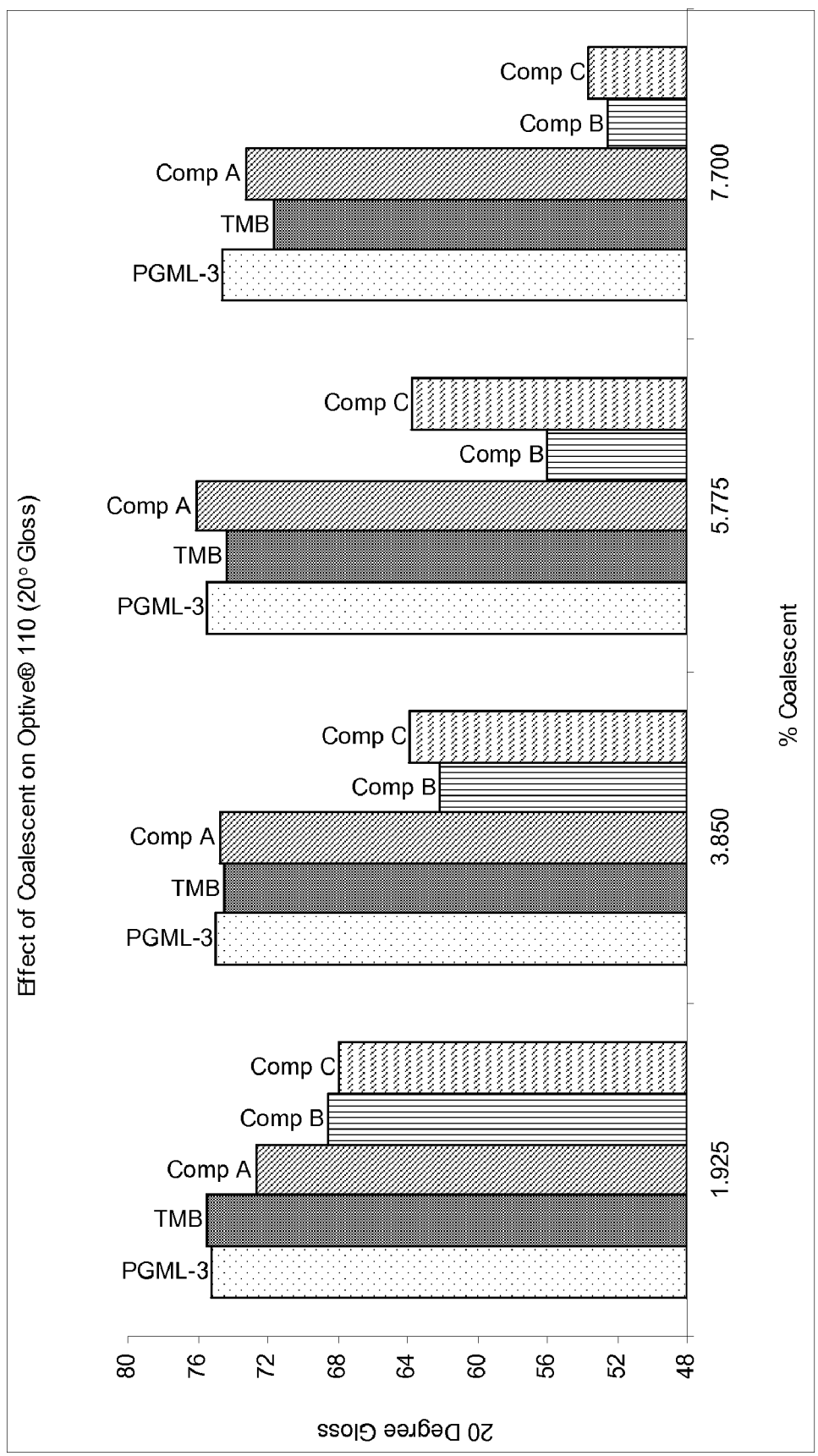
FIG. 4 illustrates the gloss value versus concentration of coalescent for an inventive composition and prior art compositions.
Figure 5:
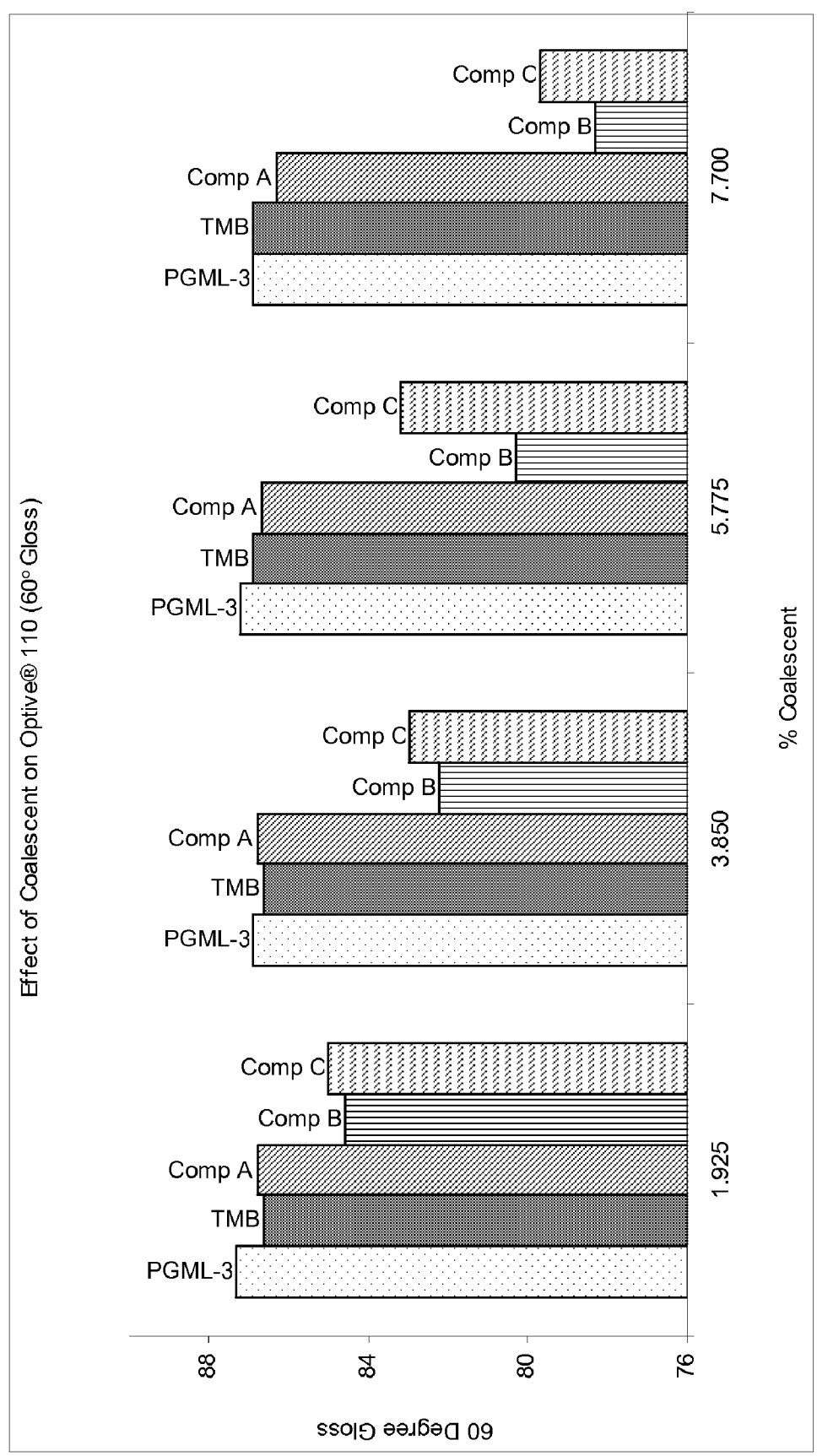
FIG. 5 illustrates the gloss value versus concentration of coalescent for an inventive composition and prior art compositions.
Figure 6:
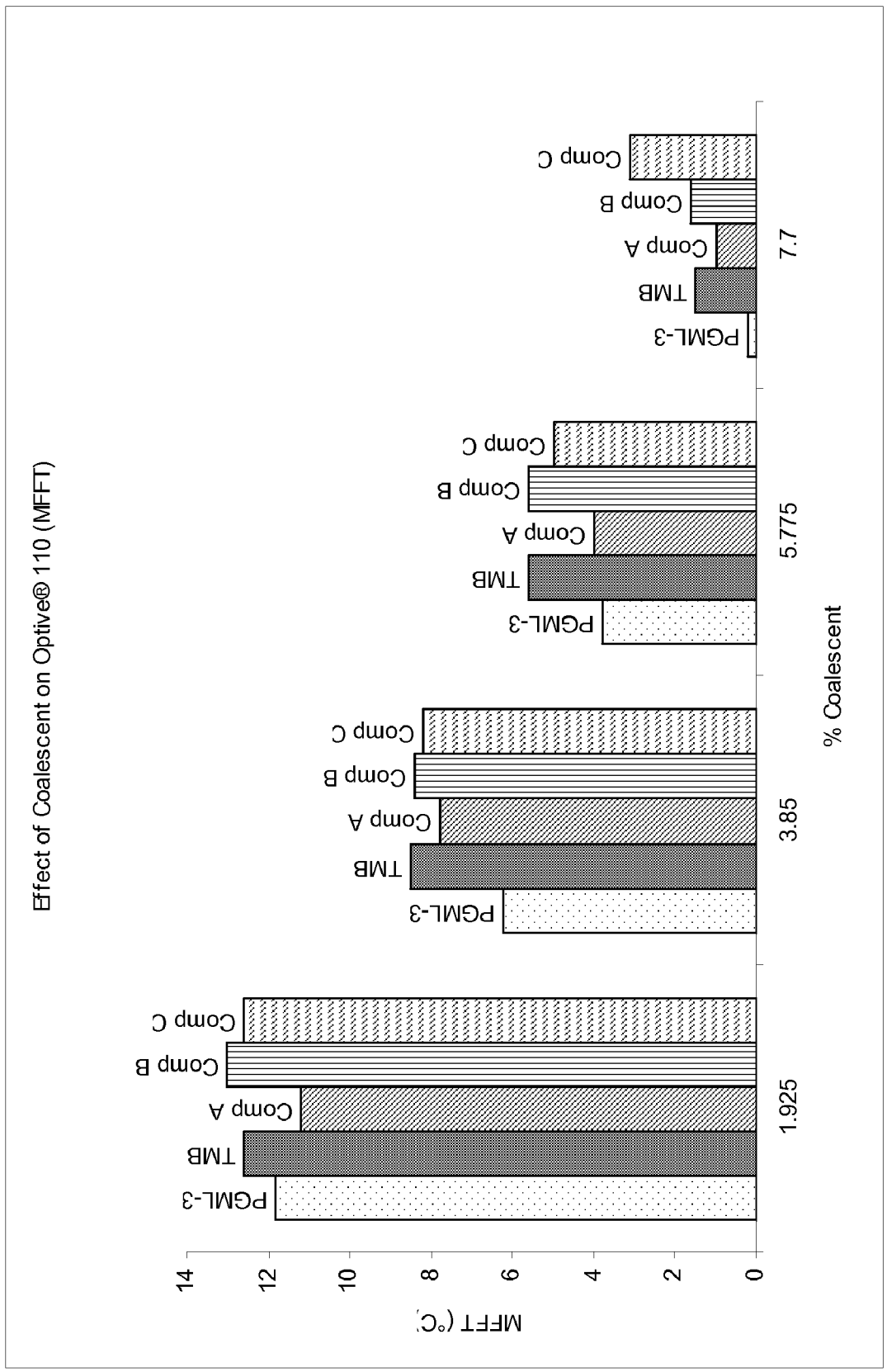
FIG. 6 illustrates the gloss value versus concentration of coalescent for an inventive composition and prior art compositions.

Comparison of Propylene Glycol Monolaurate (PGML-3, Undistilled) With Commercial Coalescents in an Acrylic Resin In a manner similar to Example 1, a series of blends consisting of increasing amounts of coalescent were added to Acronal Optive® 110. The coalescents included PGML-3, an undistilled propylene glycol monolaurate with <2% PGDL, and a number of commercial coalescents. Films of these blends were prepared as described in Example 1. Both 20° and 60° gloss readings were obtained. In addition, the MFFT of these coalescent resin blends were measured as described in Example 7. The gloss and MFFT data are shown graphically in FIGS. 4-6 where TMB: 2,2,4-trimethyl-1,3-pentanediol mono(2-methylpropanoate); Competitive Sample A which is believed to be triethylene glycol bis(2-ethylhexanoate); Competitive Sample B which is believed to consist mainly of propylene glycol monooleate; Competitive Sample C which is believed to consist mainly of propylene glycol monoesters of polyunsaturated C18 fatty acids. The data shows that PGML-3 gives equal or better performance in comparison to these commercial coalescents Example 10

Figure 7:
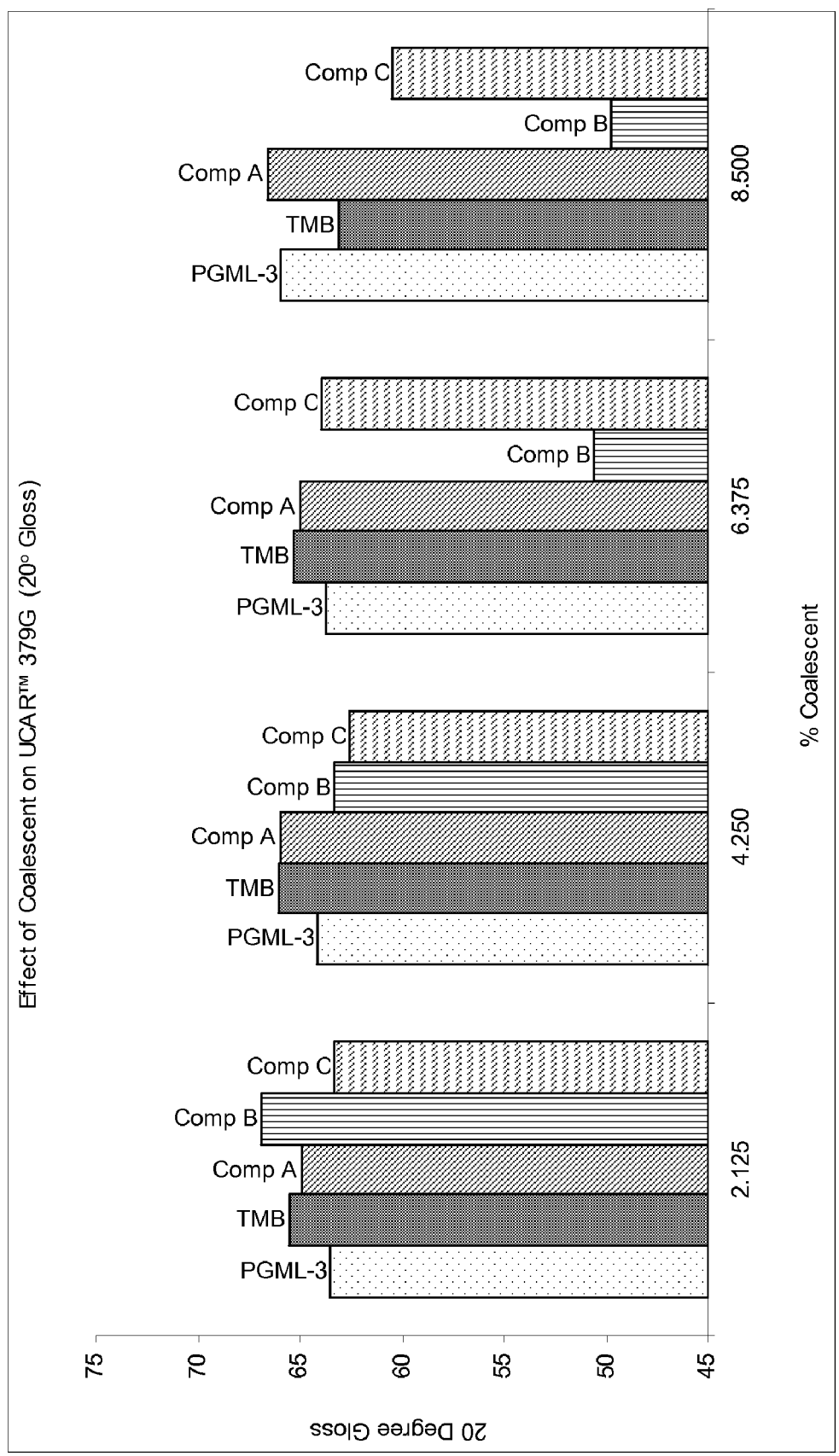
FIG. 7 illustrates the gloss value versus concentration of coalescent for an inventive composition and prior art compositions.
Figure 8:
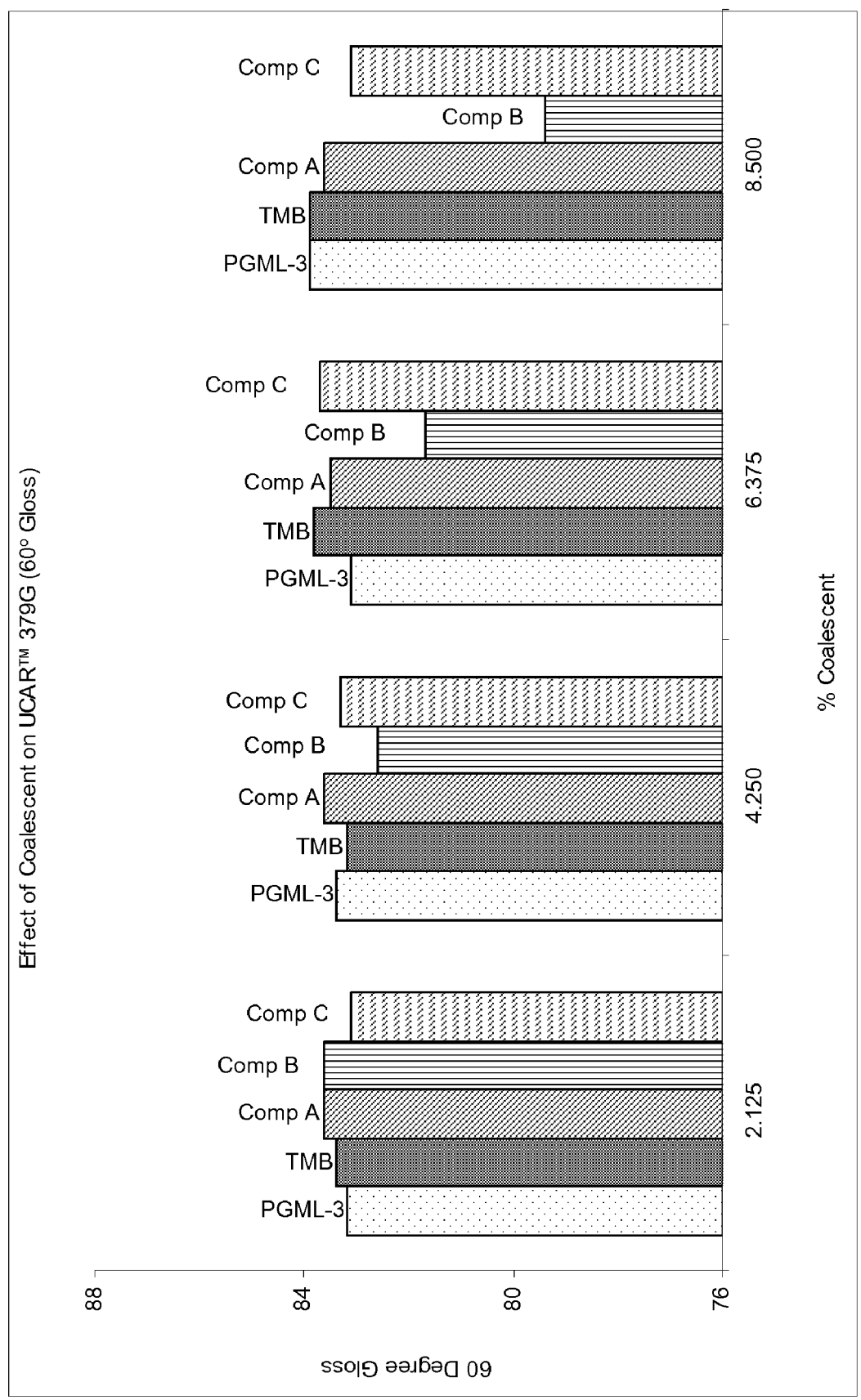
FIG. 8 illustrates the gloss value versus concentration of coalescent for an inventive composition and prior art compositions.
Figure 9:
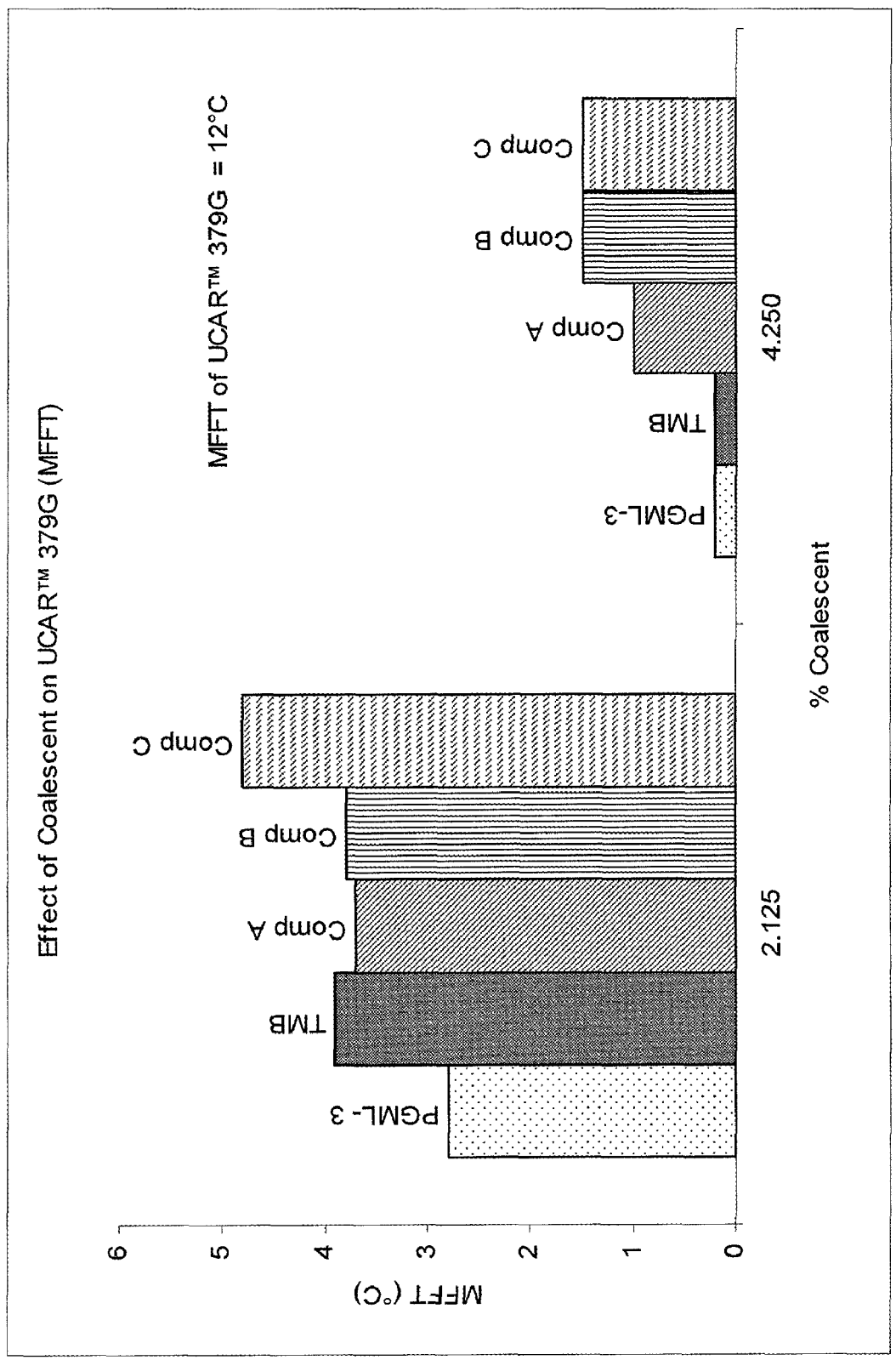
FIG. 9 illustrates the gloss value versus concentration of coalescent for an inventive composition and prior art compositions.

Comparison of Propylene Glycol Monolaurate (PGML-3, Undistilled) With Commercial Coalescents in a Vinyl Acrylic Resin In a manner similar to Example 1, a series of blends consisting of increasing amounts of coalescent were added to UCAR 379G™. The coalescents included PGML-3, an undistilled propylene glycol monolaurate with <2% PGDL, and a number of commercial coalescents. Films of these blends were prepared as described in Example 1. Both 20° and 60° gloss readings were obtained. In addition, the MFFT of these coalescent resin blends were measured as described in Example 7. The gloss and MFFT data are shown graphically in FIGS. 7-9 where TMB: 2,2,4-trimethyl-1,3-pentanediol mono(2-methylpropanoate); Competitive Sample A which is believed to be triethylene glycol bis(2-ethylhexanoate); Competitive Sample B which is believed to consist mainly of propylene glycol monooleate; Competitive Sample C which is believed to consist mainly of propylene glycol monoesters of polyunsaturated C18 fatty acids. The data shows that PGML-3 gives equal or better performance in comparison to these commercial coalescents.

Example 11

Comparison of the Block Resistance of Propylene Glycol Monolaurate to Commercial Coalescents in an Acrylic Paint An Acrylic masterbatch was prepared as described below using Acronal Optive® 110. In a manner similar to Example 1, a series of coalescent/masterbatch blends were prepared. The series included PGML-3 (undistilled) and two commercial coalescents. In accordance with ASTM D4946-89, 6 mil wet films were drawn down on Leneta 7B sealed test charts. The charts were dried at 25° C. and 50% relative humidity for 7 days. Block resistance measurements were then carried out at 25° C. for 24 hours. The results of these tests are reported in Table 8. The results indicate that the block resistance of the paint containing PGML-3 is equal to the commercial coalescents tested.

Acrylic Acronal Optive ® 110 Masterbatch Exterior Semi-Gloss Paint

| Raw Material | Pounds | Gallons | Weight % |
|---|---|---|---|
| Water | 122.00 | 14.66 | 11.58 |
| Natrosol 330 Plus | 0.80 | 0.07 | 0.08 |
| Proxel GXL | 2.00 | 0.21 | 0.19 |
| Ethylene Glycol | 28.00 | 3.01 | 2.66 |
| AMP 95 | 2.00 | 0.25 | 0.19 |
| Drewplus L493 | 2.00 | 0.26 | 0.19 |
| Tamol 731A | 7.00 | 0.76 | 0.66 |
| Add to water, mix and hydrate - then add while mixing: | | | |
| Minex 7 | 25.00 | 1.15 | 2.37 |
| Add slowly to vortex - HSD to 5 Hegman: | | | |
| Water | 70.50 | 8.47 | 6.69 |
| TiPure R706 | 229.50 | 6.89 | 21.78 |
| Letdown: RM and water holdout for adjustme | | | |
| Drewplus L493 | 3.00 | 0.39 | 0.28 |
| Optive 110 | 520.00 | 58.76 | 49.35 |
| Aquaflow NHS 300 | 16.00 | 1.85 | 1.52 |
| Texanol* | 20.00 | 2.53 | 1.90 |
| Water* | 6.00 | 0.72 | 0.57 |

| Raw Material | Description | Supplier |
|---|---|---|
| Water | | |
| Natrosol ® 330 Plus | cellulosic thickener | Hercules |
| Proxel ® GXL | in-can biocide | Arch Chemicals |
| Ethylene Glycol | glycol | |
| AMP 95 | buffer | Angus |
| Drewplus ® L 493 | defoamer | Drew Industrial |
| Tamol ™ 731A | dispersant | Rohm & Haas |
| Minex ® 7 | extender | Unimin |
| TiPure ® R706 | titanium dioxide | DuPont |
| Drewplus ® L 493 | defoamer | Drew Industrial |
| Optive ® 110 | acrylic resin | BASF |
| Aquaflow ® NHS 300 | associative thickener | Hercules |

*held out

TABLE 8

| Coalescent* | Block Resistance** |
|---|---|
| Texanol ® | 8 |
| PGML-3 (undistilled) | 8 |
| Archer RC | 8 |

*on a scale of 1-10 with 10 being the best
**Coalescent = 7.7% on resin solids

Example 12

Comparison of Propylene Glycol Monolaurate and Commercial Coalescents in an Acrylic Resin An acrylic latex (Rhoplex SG10M) was blended with various levels of different coalescents (one example of an inventive coalescent and two commercial compositions) in a manner similar to Example 1. These coating compositions were applied to a scrub chart, as described in Table 9, and air dried. The resulting films were evaluated for film formation, gloss/haze, substrate wetting, and tackiness. The results for these parameters are included in Table 9, which shows that the coating including PGML-2 exhibited good film formation, clear films, good wetting of the substrate, etc. The results in Table 9 comprise subjective ratings on a scale of 1-10 (10 being the best) for each parameter.

TABLE 9

Rhoplex SG10M Acrylic Latex Coalesced with Various Coalescents/Levels

| | Blank (no solvent) | PGML-2 | Dapro FX513 | Com. Coalescent* |
|---|---|---|---|---|
| 2.5% Loading | | | | |
| Film Formation | 10 | 10 | 10 | 8 |
| Gloss/Haze | 10 | 10 | 8 | 7 |
| Substrate Wetting | 10 | 10 | 8 "orange peel" | 1: craters - crawling |
| Tackiness | | | | |
| 6-hours | 10 | 9 | 9 | 9 |
| 24-hours | | | | |
| 5.0% Loading | | | | |
| Film Formation | | 10 | 10 | 8-micro mud-cracking |
| Gloss/Haze | | 10 | 6 | 10 |
| Substrate Wetting | | 8 "orange peel" | 9 "orange peel" | 7 "orange peel" |
| Tackiness | | | | |
| 6-hours | | 8 | 9 | 8 |
| 24-hours | | | | |
| 10.0% Loading | | | | |
| Film Formation | | 10 | 10 | 8 |
| Gloss/Haze | | 9 | 4 | 6 |
| Substrate Wetting | | 10 | 7 "orange peel" | 4-orange peel/craters |
| Tackiness | | | | |
| 6-hours | | 6 | 8 | 7 |
| 24-hours | | | | |
| 15.0% Loading | | | | |
| Film Formation | | 10 | 10 | 7 |
| Gloss/Haze | | 10 | 4 | 9 |
| Substrate Wetting | | 9 "orange peel" | 9 "orange peel" | 9 "orange peel" |

TABLE 9-continued

Rhoplex SG10M Acrylic Latex Coalesced with Various Coalescents/Levels

| | Blank (no solvent) | PGML-2 | Dapro FX513 | Com. Coalescent* |
|---|---|---|---|---|
| Tackiness | | | | |
| 6-hours | | 5 | 7 | 6 |
| 24-hours | | | | |

Clear Films Applied: Black Scrub Chart, #S222 rod, 72° F./39% RH
Films Air Dried: 25° C./50% RH

*Believed to be triethylene glycol bis(2-ethylhexanoate)

Example 13

Comparison of Propylene Glycol Monolaurate (PGML-3, Undistilled) With Texanol in an Acrylic Paint Two semi gloss acrylic based paints were prepared as described below. PGML was used in place of Texanol in the second paint. A number of standard tests were carried out on these paints using the procedures outlined in the associated ASTM methods. The results are listed in Table 10. The results show that PGML can be used in place of Texanol in this semi gloss acrylic paint without any significant reduction in the performance of the paint SG-30-1: 150 g/L VOC Quality Interior Semigloss White

| Pounds | Gallons | Weight % | Raw Material |
|---|---|---|---|
| Add in order listed with good mixing: | | | |
| 325.50 | 16.75 | 31.01 | Kronos 4311 |
| 79.30 | 9.52 | 7.56 | Water |
| 34.60 | 4.00 | 3.30 | Propylene Glycol |
| 1.80 | 0.21 | 0.17 | Kathon LX 1.5% |
| 501.40 | 56.75 | 47.78 | Rhoplex SG30 |
| 12.50 | 1.61 | 1.19 | Texanol |
| 1.50 | 0.16 | 0.14 | Aerosol OT-75 |
| 2.10 | 0.25 | 0.20 | BYK 022 |
| 1.00 | 0.13 | 0.10 | Ammonia (28%) |
| Add ingredients below separately with good mixing. Mix for 30 minutes | | | |
| 17.30 | 1.89 | 1.65 | RM 2020 |
| 16.20 | 1.89 | 1.54 | RM 825 |
| 56.30 | 6.76 | 5.36 | Water |
| 1049.50 | 99.95 | 100.00 | TOTAL |

| Raw Material | Description | Supplier |
|---|---|---|
| Kronos 4311 | TiO$_2$ Slurry | Kronos |
| Propylene Glycol | glycol | |
| Kathon LX 1.5% | Biocide | Rohm and Haas |
| Rhoplex SG30 | Acrylic Latex | Rohm and Haas |
| Texanol | Coalescent | Eastman Chemical |
| Aerosol OT-75 | Surfactant | Cytec |
| BYK 022 | Defoamer | BYK-Chemie |
| Ammonia (28%) | Base | |
| RM 2020 | Rheology Modifier | Rohm and Haas |
| RM 825 | Rheology Modifier | Rohm and Haas |

TABLE 10

Semi Gloss Acrylic Paint based on RHOPLEX SG30

| Untinted | Units | ASTM | Coalescent: 5% Weight (based on resin solids) | |
|---|---|---|---|---|
| | | | Texanol | PGML-3 |
| White Base | | | | |
| Coalescent: (wt. % base on resin solids) | Wt % | | 5.0 | 5.0 |
| VOC (Coalescent)* | g/L | | 36.18 | 1.42 |
| VOC (paint) | g/L | | 150.69 | 115.96 |
| Viscosity, 25° | | | | |
| KU | KU | D 562 | 117 | 114 |
| ICI | Poise | D 4287 | 1.3 | 1.5 |
| 3 mil WFT Drawdown | | | | |
| 60° Gloss | | | 74.3 | 79.5 |
| 20° Gloss | | D 523 | 36.7 | 45.2 |
| Contrast Ratio | | D 2805 | 0.972 | 0.973 |
| CIELab Values L* | | D 5326 | 96.68 | 96.71 |
| a* | | | −1.08 | −1.07 |
| b* | | | 2.03 | 1.96 |
| Sward Hardness 1-day | cycles | D 2134 | 12 | 12 |
| 7-days | cycles | | 12 | 12 |
| Pencil Hardness (7-days) | lead # | D 3363 | F | B |
| Zapon Tack Free Time | 30"/500 g | | | |
| 1-day | pass/fail | | pass | fail |
| 7-days | pass/fail | | pass | pass |
| Sag Resistance | mils | D 4400 | 8 | 8 |
| Leveling | 0-10(best) | D 4062 | 10 | 10 |
| Block Resistance (7-day) | 1000 g | D 4946 | | |
| Room temp: 1-day dwell | 0-10(best) | | 10 | 9 |
| 120° F.: 30-min. dwell | 0-10(best) | | 8 | 7 |
| Scrub Resistance | | D 2486 | | |
| Cycles to failure | cycles | | 1331 | 1748 |
| % of control | % | | 100 | 131 |

*Contribution of coalescent to the total VOC of paint. This calculation is based on the measured wt % VOC of the neat coalescent using EPA Method 24.

Example 14

Use of Propylene Glycol Monolaurate (PGML-3, Undistilled) in a Styrene Acrylic Paint Three high gloss styrene acrylic based paints were prepared using the High Gloss DTM Enamel as described below. PGML was used as a partial replacement for dipropylene glycol n-butylether in some of the samples of Table 11. In addition, the total level of coalescent was reduced in some of the samples of Table 11. A number of standard tests were carried out on these paints using the procedures outlined in the associated ASTM methods. The results are listed in Table 11. The results show that PGML can be used as a partial replacement of dipropylene glycol n-butylether in this styrene acrylic paint without any significant reduction in the performance of the paint. In addition, the total coalescent level can be reduced without effecting the paint performance.

EPS 2535 WHT BT-1: High Gloss DTM Enamel - White

| Pounds | Gallons | Weight % | Raw Material | Note |
|---|---|---|---|---|
| Add with good aggitation | | | | |
| 37.50 | 4.50 | 3.68 | Water | |
| 13.00 | 1.50 | 1.28 | Propylene Glycol | |
| 8.00 | 0.87 | 0.79 | Tamol 681 | |
| 5.00 | 0.69 | 0.49 | Surfynol 104A | |
| 3.00 | 0.38 | 0.29 | AMP 95 | |

EPS 2535 WHT BT-1: High Gloss DTM Enamel - White

| | | | |
|---|---|---|---|
| 1.50 | 0.19 | 0.15 | Dehydran 1620 |
| 225.00 | 6.45 | 22.08 | RCL-535 |

Disperse to 7 Hegman, Adjust grind, rinse mill

| | | | |
|---|---|---|---|
| 6.00 | 0.72 | 0.59 | Water |

To Letdown tank charge:

| | | | |
|---|---|---|---|
| 584.80 | 68.00 | 57.40 | EPS 2535 |
| 17.30 | 2.00 | 1.70 | Propylene Glycol |
| 1.50 | 0.16 | 0.15 | Nuosept 95 |

Add grind from above

Add:

| | | | | |
|---|---|---|---|---|
| 29.20 | 3.51 | 2.87 | Water | Premix H$_2$0 and DPnB |
| 10.00 | 1.15 | 0.98 | Sodium Nitite, 4% | |
| 66.00 | 8.63 | 6.48 | DPnB | |
| 0.00 | 0.00 | 0.00 | Dapro FX514 | |
| 5.00 | 0.55 | 0.49 | RM 2020 | Premix with H$_2$0 |
| 3.00 | 0.34 | 0.29 | RM 825 | |

Adjust final viscosity

| | | | |
|---|---|---|---|
| 3.00 | 0.36 | 0.29 | Water |
| 1018.80 | 100.01 | 100.00 | TOTAL |

| Raw Material | Description | Supplier |
|---|---|---|
| Propylene Glycol | Glycol | |
| Tamol 681 | Dispersant | Rohm and Haas |
| Surfynol 104A | Surfactant | Air Products |
| AMP 95 | Base | Dow Chemical |
| Dehydran 1620 | Defoamer | Cognis |
| RCL-535 | Titanium Dioxide | Millenium |
| EPS 2535 | Styrene Acrylic Latex | EPS, Inc |
| Propylene Glycol | Glycol | |
| Nuosept 95 | Biocide | International Specialty Products |
| Sodium Nitrite, 4% | Anticorrosion | |
| DPnB | Coalescent | Dow Chemical |
| RM 2020 | Rheology Modifier | Rohm and Haas |
| RM 825 | Rheology Modifier | Rohm and Haas |

*Contribution of coalescent to the total VOC of paint. This calculation is based on the measured wt % VOC of the neat coalescent using EPA Method 24.

TABLE 11

High Gloss Styrene Acrylic Paint based on EPS 2535

| Untinted White Base | Units | ASTM | A DPnB | B DPnB | B PGML | C DPnB | C PGML |
|---|---|---|---|---|---|---|---|
| Coalescent: (wt. % bors) | wt. % | | 25.00 | 20.00 | 5.00 | 18.75 | 6.25 |
| VOC (from coalescent)* | g/l | | 157.96 | 126.56 | 1.27 | 121.74 | 1.58 |
| VOC (paint) | g/l | | 249.80 | 219.80 | | 212.29 | |
| Viscosity, 25° | | | | | | | |
| KU | KU | D 562 | 106 | 107 | | 115 | |
| ICI | Poise | D 4287 | 1.6 | 1.8 | | 1.9 | |
| 3 mil WFT Drawdown | | | | | | | |
| 60° Gloss | | | 92.2 | 91.7 | | 92.3 | |
| 20° Gloss | | D 523 | 73.7 | 72 | | 74.8 | |
| Contrast Ratio | | D 2805 | 0.974 | 0.977 | | 0.973 | |
| CIELab Values L* | | D 5326 | 96.25 | 95.39 | | 95.26 | |
| a* | | | −1.08 | −1.57 | | −1.59 | |
| b* | | | 2.51 | 1.38 | | 1.37 | |
| Sward Hardness | | D 2134 | | | | | |
| 1-day | cycles | | 4 | 0 | | 2 | |
| 3-days | cycles | | 4 | 4 | | 4 | |
| 7-days | cycles | | 8 | 6 | | 6 | |
| Zapon Tack Free Time | 30"/500 g | | | | | | |
| 1-day | pass/fail | | pass | fail | | pass | |
| 3-days | pass/fail | | pass | pass | | pass | |
| 7-days | pass/fail | | pass | pass | | pass | |
| Sag Resistance | mils | D 4400 | 10 | 8 | | 8 | |
| fingers | yes/no | | no | no | | no | |
| Leveling | 0-10(best) | D 4062 | 10 | 10 | | 10 | |
| Block Resistance (7-day) | 1000 g | D 4946 | | | | | |
| Room temp: 1-day dwell | 0-10(best) | | 8 | 8 | | 7 | |
| 120° F.: 30-min. dwell | 0-10(best) | | 0 | 0 | | 0 | |
| Scrub Resistance | | D 2486 | | | | | |
| Cycles to failure | cycles | | 1707 | 1744 | | 1623 | |
| % of control | % | | | 102.2 | | 95.1 | |
| Stain Removal | | D 3450 | | | | | |
| Reflectance Recovery | | | 98.56 | 100.32 | | 99.85 | |

TABLE 11-continued

High Gloss Styrene Acrylic Paint based on EPS 2535

| Untinted White Base | Units | ASTM | A DPnB | B DPnB | B PGML | C DPnB | C PGML |
|---|---|---|---|---|---|---|---|
| Adhesion: Aged Gloss Alkyd | | D 3359 | | | | | |
| Dry: 1-day | | | 0B | 1B | | 0B | |
| Dry: 7 day | | | 0B | 1B | | 0B | |
| Wet: 7 day | 0-5B(best) | | 0B | 0B | | 0B | |
| 40° C. Mud cracking | | | | | | | |
| sealed | mils | | >60 | >60 | | >60 | |
| unsealed | mils | | >60 | >60 | | >60 | |
| Freeze Thaw Stability | | D 2243 | | | | | |
| Cycles 1 | | | gelled | gelled | | gelled | |
| 120° F. Heat Age Stability (2-wks) | | | | | | | |
| Syneresis | mm | | 0 | 0 | | 0 | |
| ☐KU | KU | D 562 | −2 | −1 | | 1 | |
| ☐ICI | Poise | D 4287 | 0.4 | 0.0 | | 0.1 | |

We claim:

1. A film-forming composition comprising a water-based film-forming polymer, and a coalescent aid comprising a fatty acid ester of an ethylene glycol, propylene glycol, or ethylene-propylene glycol of the following formula:

$$R^1COO[(EO)_x(PO)_y]_zH$$

wherein $R^1CO$ is a linear saturated aliphatic acyl group and wherein $R^1$ comprises at least about 80% $C_{11}$-$C_{13}$, EO is —$CH_2CH_2O$—, PO is —$CH_2CH(CH_3)O$— or —$CH(CH_3)CH_2O$— or a combination thereof, where the acyl radical is bonded to a carbon atom of the EO or PO radical, and x=0 to about 5, y=about 0 to about 5, the sum of x and y is equal or greater than 0.5, z=1 to about 5, and (x+y)z is less than or equal to 6.

2. The film-forming composition of claim 1, wherein x=0, y=n, and z=1, where n=0.5 to about 5.

3. The film-forming composition of claim 2, wherein x=0, y=n, and z=1, where n=0.5 to about 2.

4. The film-forming composition of claim 2, wherein n=0.8 to about 1.

5. The film-forming composition of claim 1, wherein $R^1$ comprises at least about 90% $C_{11}$-$C_{13}$.

6. The film-forming composition of claim 1, wherein $R^1$ comprises at least about 95% $C_{11}$-$C_{13}$.

7. The film-forming composition of claim 1, wherein $R^1$ comprises at least about 98% $C_{11}$-$C_{13}$.

8. The film-forming composition of claim 1, wherein the water-based film-forming polymer comprises a latex.

9. The film-forming composition of claim 1 further comprising an additive selected from the group consisting of wetting aids, dispersants, thickeners, defoaming agents, algicides, ultra-violet inhibitors, flow agents, leveling agents, rheology modifiers, freeze thaw stabilizing agents, pH modifiers, flash rust inhibitors, biocides, pigments, fillers and dyes.

10. The film-forming composition of claim 1 wherein the film-forming composition comprises a mixture of coalescent aids and the fatty acid ester comprises at least about 5 wt. % of the mixture.

11. The film-forming composition of claim 1 wherein the film-forming composition contains at least about 20 wt. % water.

12. The film-forming composition of claim 1 wherein the film-forming composition contains at least about 20 wt. % water, at least about 10 wt. % water-based film-forming polymer, and the weight of the ester is about 0.1% to about 50% of the weight of the water-based film-forming polymer.

13. The film-forming composition of claim 1 wherein the weight of the fatty acid ester is about 0.1% to about 50% of the weight of the water-based film-forming polymer.

14. The film-forming composition of claim 1 wherein the weight of the fatty acid ester is about 0.1% to about 25% of the weight of the water-based film-forming polymer.

15. The film-forming composition of claim 1, wherein the water-based film-forming polymer comprises at least one acrylic resin.

16. The film-forming composition of claim 1, wherein the water-based film-forming polymer comprises at least one vinyl acrylic resin.

17. The film-forming composition of claim 1, wherein the water-based film-forming polymer comprises at least one styrene acrylic resin.

18. The film-forming composition of claim 1, wherein the water-based film-forming polymer comprises a blend of acrylic resin and/or vinyl acrylic resin and/or styrene acrylic resin.

19. The film-forming composition of claim 1, wherein the coalescent aid comprises less than about 10% diester, wherein the diester comprises the formula $R^1COO[(EO)_x(PO)_y]_z$—$C(=O)R^1$.

20. The film forming composition of claim 1 wherein the fatty acid ester is formed by the direct esterification of a fatty acid with ethylene glycol and/or propylene glycol.

21. The film forming composition of claim 1 wherein the fatty acid ester is formed by reaction of a fatty acid with ethylene oxide and/or propylene oxide.

22. The film forming composition of claim 1 wherein the fatty acid ester is formed by reaction of a fatty acid with ethylene oxide and/or propylene oxide using a phosphine reaction catalyst.

23. The film forming composition of claim 1 wherein the fatty acid ester is formed by reaction of a fatty acid with ethylene oxide and/or propylene oxide using triphenylphosphine as a reaction catalyst.

24. A film-forming composition comprising a water-based film-forming polymer, and a coalescent aid comprising at least 70% of propylene glycol monolaurate.

25. A method of coalescing an aqueous film forming composition comprising use of the fatty acid ester of claim 1.

* * * * *